W. R. FORD.
TIRE.
APPLICATION FILED FEB. 5, 1920.

1,363,035.

Patented Dec. 21, 1920.
2 SHEETS—SHEET 1.

Inventor
W. R. Ford,

By G. Hume Talbert,
Attorney

W. R. FORD.
TIRE.
APPLICATION FILED FEB. 5, 1920.
1,363,035.
Patented Dec. 21, 1920.
2 SHEETS—SHEET 2.
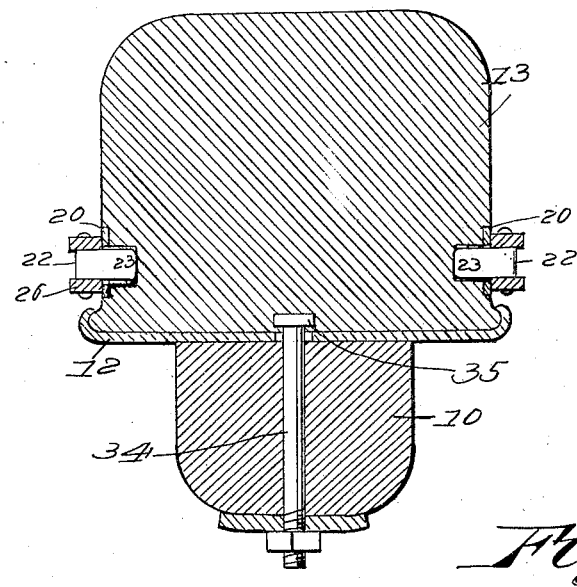
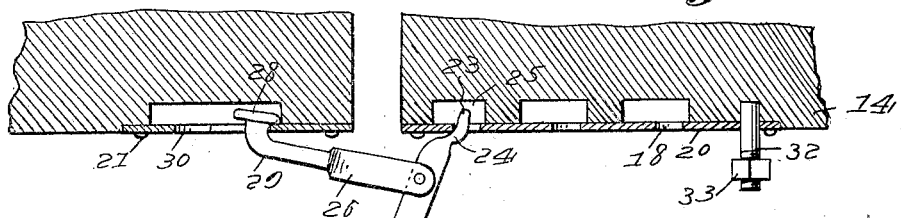
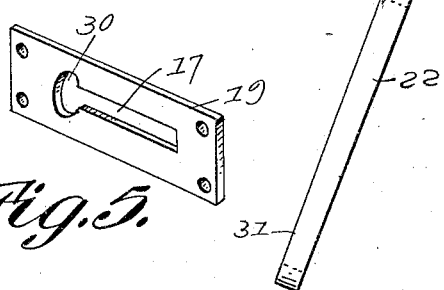
Inventor
W. R. Ford
By
G. Hume Talbert
Attorney

UNITED STATES PATENT OFFICE.

WILLIAM R. FORD, OF JACKSBORO, TEXAS.

TIRE.

1,363,035.  Specification of Letters Patent.  Patented Dec. 21, 1920.

Application filed February 5, 1920. Serial No. 356,557.

*To all whom it may concern:*

Be it known that WILLIAM R. FORD, a citizen of the United States of America, residing at Jacksboro, in the county of Jack and State of Texas, has invented new and useful Improvements in Tires, of which the following is a specification.

The object of the invention is to provide a simple, inexpensive and readily removable tire adapted for detachment from and replacement upon the fixed rim of the wheel with the minimum of effort and expenditure of time upon the part of the operator and under such conditions as to insure the stability and permanence of the attachment when the parts have been properly adjusted and secured, to the end that the replacement of a wheel tire may be effected under adverse conditions with the minimum of inconvenience to the operator; and with these objects in view the invention consists in a construction and combination of parts of which a preferred embodiment is shown in the accompanying drawings, wherein:

Fig. 3 is a transverse section.

Fig. 4 is an enlarged detail horizontal section of the locking means showing the first step in the interlocking of the parts.

Fig. 5 is a detail view of one of the anchor plates.

Fig. 8 is a similar view of the other anchor plate.

Fig. 7 is a similar view of the terminal head of the heel strap.

The device embodying the invention is shown in connection with a wheel of the type having a felly 10 to which are connected the outer ends of the spokes 11 and the felly band or fixed wheel rim 12, and for the purposes of illustration a transversely split, solid or cushion tire 13 is fitted on the fixed rim 12, although it will be understood that in cross-sectional form and similar details the elements may be modified in accordance with the different types of wheels and tires now in commercial use.

Figure 1:
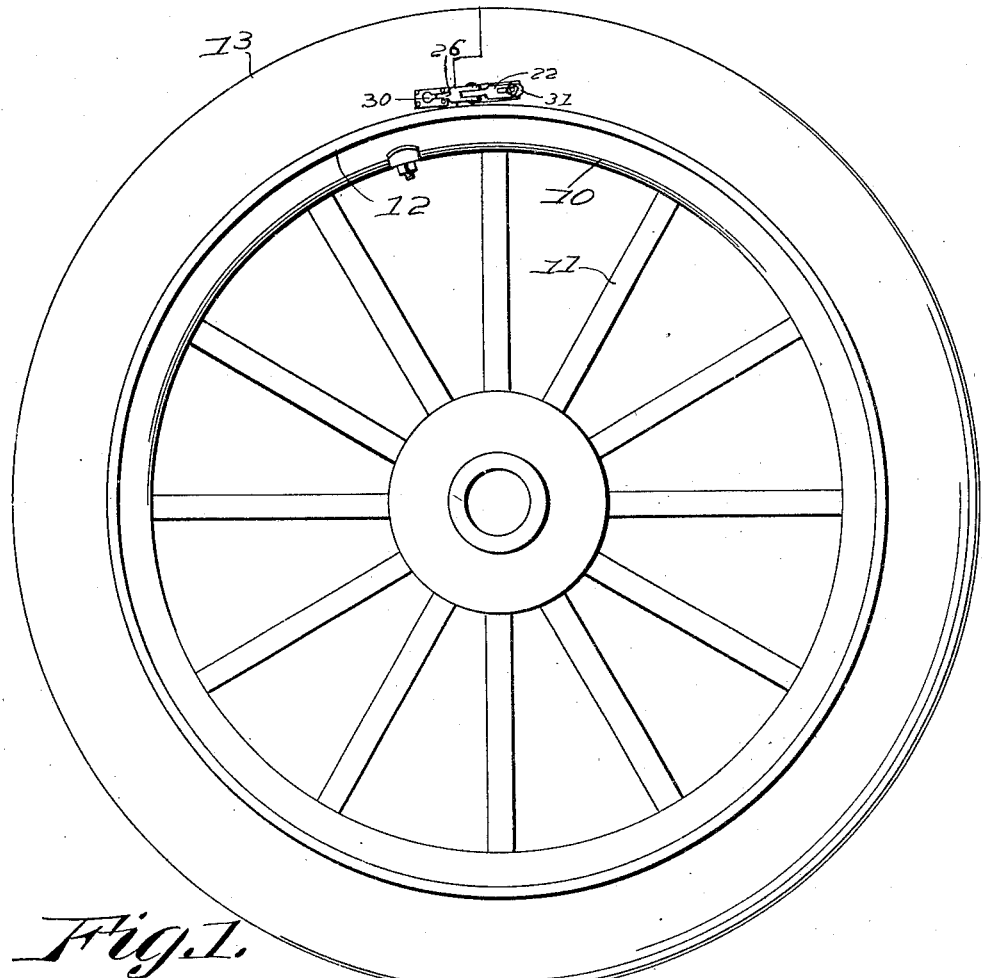
Figure 1 is a side view of a wheel having a demountable tire constructed in accordance with the invention.
Figure 2:
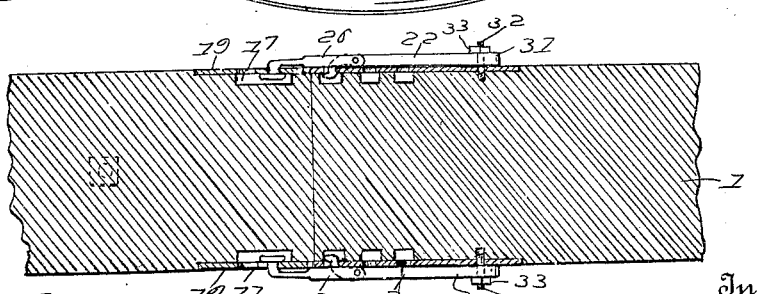
Fig. 2 is a horizontal sectional view of the same taken in the plane of the locking means.

Adjacent to its extremities the demountable tire is provided with a longitudinal keyhole slot 17 and a plurality of seats 18 disposed at intervals longitudinally of the tire on the side wall thereof, said slot and seats preferably being formed respectively in anchor plates 19 and 20 substantially secured by rivets or otherwise as indicated at 21 to the sides of the tire, it being understood that in respect of the contracting and fastening means the mechanism is duplicated at opposite sides or in relation to the opposite walls or flanges of the tire, as will be noted by referring to Figs. 2 and 3 of the drawings. In combination with the anchor plates constructed as described there is employed a clamp consisting of a latch or lever member 22 provided with a terminal stud 23 for engagement with one of the seats 18 and having an offset indicated at 24 to permit of arranging the shank of said member in parallelism with the anchor 20 and hence with the adjacent side wall of the tire, sufficient clearance for the movement of the inner projecting end of the stud being provided by openings 25 formed in the tire wall in communication with the seats 18, and pivotally connected with the latch or lever member of the clamp is a heel strap 26 provided with a terminally enlarged head 28 adapted to pass through the enlarged portion 30 of the keyhole slot 17 to permit of the engagement of the shank 29 of said strap with the reduced or parallel sided portion of the slot as shown clearly in Fig. 4.

Having engaged the head of the heel strap with the keyhole slot and inserted the stud of the latch or lever member in a selected seat 18 of the anchor plate 20, a swinging movement of the lever will draw the extremities of the tire together and at the same time position an eye 31 in engagement with a locking member 32 consisting in the construction illustrated of a bolt extended through anchor plate 20 and provided with a nut 33. It will be noted that the eye 31 is elongated to permit of the engagement thereof with the locking device regardless of the seat 18 with which the stud 23 may be engaged.

It will be noted that the connection and relative positions of the elements of the latch will provide for a forcible stretching of the tire to insure a firm seating of the same upon the fixed rim of the wheel, and that when the parts are in their normal positions the elements of the latch are disposed in longitudinal relation with the strain tending to open the tire, so that a minimum of stress in resisting such tendency is imposed upon the locking means, and that therefore the possibility of disarrangement of the elements when secured in their adjusted positions is minimized whereas the elements themselves may be made of comparatively light material and of relatively small dimensions affording no objectionable or undesirably conspicuous projection beyond the planes of the side surfaces of the tire, and in practice the said projection as substantially indicated in the drawing will not materially exceed the normal lateral projection of the fixed rim of the wheel. To provide against the creeping of the tire on the rim, a radially disposed bolt 34 is mounted in felly 10 and has its head 35 embedded in the inner periphery of the tire.

What is claimed is:

A tire consisting of a split ring having anchor plates secured to its side walls adjacent to their extremities and provided respectively with a keyhole slot and a plurality of seats spaced in longitudinal series, the walls being provided with clearance openings in communication with said keyhole slot and seats, a plurality of clamps each having a latch member provided with a terminal offset stud for engagement with one of said seats and a heel strap pivotally connected with the latch member and having a terminally headed shank for engagement with the keyhole slot, and locking means carried by the wall for engagement with a terminal eye of the latch member when the latter is arranged in parallelism with the wall.

In testimony whereof I affix my signature.

WILLIAM R. FORD.